US006622022B1

United States Patent
Du

(10) Patent No.: US 6,622,022 B1
(45) Date of Patent: Sep. 16, 2003

(54) WIRELESS NETWORK WITH CLOCK SYNCHRONIZATION

(75) Inventor: Yonggang Du, Aachen (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/428,768

(22) Filed: Oct. 28, 1999

(30) Foreign Application Priority Data

Oct. 28, 1998 (DE) .......................................... 198 49 458

(51) Int. Cl.$^7$ ................................................ H04Q 7/20
(52) U.S. Cl. ...................... 455/502; 455/524; 455/63.1; 455/67.11; 455/556; 370/350; 370/356; 370/107
(58) Field of Search ................................ 455/502, 63.1, 455/63.2, 63.3, 67.11, 556, 423, 424, 429, 18, 502.1, 15, 422, 507, 524, 525; 375/356, 357, 107, 108, 252; 709/248; 370/350, 103, 105, 324, 328, 503

(56) References Cited

U.S. PATENT DOCUMENTS

| | | | | |
|---|---|---|---|---|
| 4,718,109 A | * | 1/1988 | Breeden | 455/502 |
| 4,837,850 A | * | 6/1989 | Maisel | 455/502 |
| 5,363,375 A | | 11/1994 | Chuang et al. | 370/95.3 |
| 5,408,506 A | * | 4/1995 | Mincher et al. | 375/134 |
| 5,699,388 A | * | 12/1997 | Wang | 375/356 |
| 6,292,508 B1 | * | 9/2001 | Hong | 375/134 |
| 6,480,483 B2 | * | 11/2002 | Yahata et al. | 370/350 |

OTHER PUBLICATIONS

Elmar Torok, "Technologie Drahtloser Nteze", Funkschau No. 22, 1998, pp. 20–25.

* cited by examiner

Primary Examiner—Nguyen T. Vo
Assistant Examiner—Khawar Iqbal

(57) ABSTRACT

The invention relates to a wireless network with a plurality of network nodes, each of which consists of at least one electrical apparatus and at least one radio device which are arranged to exchange data via a wireless medium. A network node includes a clock supply for supplying all electrical apparatus and the radio device with its clock. A network node which is designated as a main network node transmits, via its radio device, a synchronization pattern which is dependent on the clock of its clock supply. All other network nodes, referred to as secondary network nodes, are assigned to different, hierarchically ordered distance classes in dependence on their distance from the main network node which is assigned to the highest distance class. All secondary network nodes of a distance class transmit, via their respective radio device, a synchronization pattern which is dependent on the clock of their respective clock supply and characterizes the distance class. A secondary network node synchronizes its clock supply by means of at least one received synchronization pattern of a hierarchically higher distance class.

19 Claims, 2 Drawing Sheets

WIRELESS NETWORK WITH CLOCK SYNCHRONIZATION

FIELD OF THE INVENTION

The invention relates to a wireless network with a plurality of network nodes, each of which consists of at least one electrical apparatus and at least one radio device which are arranged to exchange data via a wireless medium.

BACKGROUND AND SUMMARY OF THE INVENTION

A wireless network of this kind is known from the document "Technologie drahtloser Netze" by Elmar Török, Funkschau No. 22, 1998, pp. 20 to 25; this document describes the construction of a wireless network with a plurality of network nodes. A plurality of electrical apparatus, for example, monitors, computers etc. and a radio device are interconnected, via a bus system, in a network node. Data is exchanged with other radio devices via the radio device of each network node. The cited document does not refer to clock synchronization of all network nodes.

SUMMARY OF THE INVENTION

It is an object of the invention to provide a wireless network in which the clocks of the individual network nodes are synchronized with one another.

This object is achieved by a wireless network of the kind set forth which is characterized in accordance with the invention in that a network node includes a clock supply for supplying all electrical apparatus and the radio device with its clock, that a network node which is designated as the main network node is arranged to transmit, via its radio device, a synchronization pattern which is dependent on the clock of its clock supply, that all other network nodes, designated as secondary network nodes, are assigned to different, hierarchically ordered distance classes in dependence on their distance from the main network node which is assigned to the highest distance class, that all secondary network nodes of a distance class are arranged to transmit, via their respective radio device, a synchronization pattern which is dependent on the clock of their respective clock supply and characterizes the distance class, and that a secondary network node is arranged to synchronize its clock supply by means of at least one received synchronization pattern of a hierarchically higher distance class.

In accordance with the invention, a main network node transmits a synchronization pattern via the wireless medium, which synchronization pattern is,forwarded by secondary network nodes in the various distance classes so that a secondary network node of the hierarchically lowest distance class is indirectly synchronized by the clock of the clock supply of the main network node. In this context wireless transmission is to be understood to mean a radio, infrared, ultrasound etc. transmission.

Claim 2 discloses how a secondary network node finds its distance class after activation. In the case of a moving secondary network node and/or main network node, the distance class of a secondary network node is liable to change. The claims 3 and 4 describe the steps taken by a mobile secondary network node in order to determine its optimum distance class in all circumstances.

A secondary network node includes a correlator which is arranged to determine whether a given synchronization pattern has been received with adequate reception quality. As is disclosed in claim 5, during the time in which a synchronization pattern is awaited a secondary network node is arranged to correlate the received signal with a stored synchronization pattern and to indicate the reception of the synchronization pattern if the correlation result corresponds to an expected value. The claims 6 and 7 describe the determination of the synchronization instant for the clock synchronization in a secondary network node.

Claim 8 discloses the construction of a radio device. A protocol device in the radio device executes various protocols for the transmission of data for the wireless medium and determines, for example by comparing the pulse-shaped signal supplied by a correlator with a threshold value, whether the reception quality of a synchronization pattern is adequate. The correlator may be included, for example in a modem of the radio device.

The synchronization patterns of each distance class are different. In order to simplify the construction of the correlator, each synchronization pattern may include an identical part and a second, different part in order to characterize a respective distance class. The correlator then correlates the first part of the synchronization pattern with a stored first part of the synchronization pattern and, after detection of an adequate reception quality, the protocol device then evaluates, for example, the characterization contained in the second part of the synchronization pattern.

The invention also relates to a network node of a wireless network which includes a plurality of further network nodes, which network node consists of at least one electrical apparatus and at least one radio device which are arranged to exchange data via a wireless medium. The network node includes a clock supply for supplying all electrical apparatus and the radio device with its clock. The network node which is designated as a secondary network node belongs to a distance class which forms part of a plurality of hierarchically ordered distance classes; its distance class is dependent on its distance from a main network node which is assigned to the highest distance class. The secondary network node is arranged to transmit, via its radio device, a synchronization pattern which is dependent on the clock of the relevant clock supply and characterizes its distance class, and to synchronize its clock supply by means of at least one received synchronization pattern of a hierarchically higher distance class.

BRIEF DESCRIPTION OF THE DRAWINGS

Embodiments of the invention will be described in detail hereinafter with reference to the FIGURES. Therein.

DETAILED DESCRIPTION OF THE PREFERRED EMBODIMENTS

Figure 1:
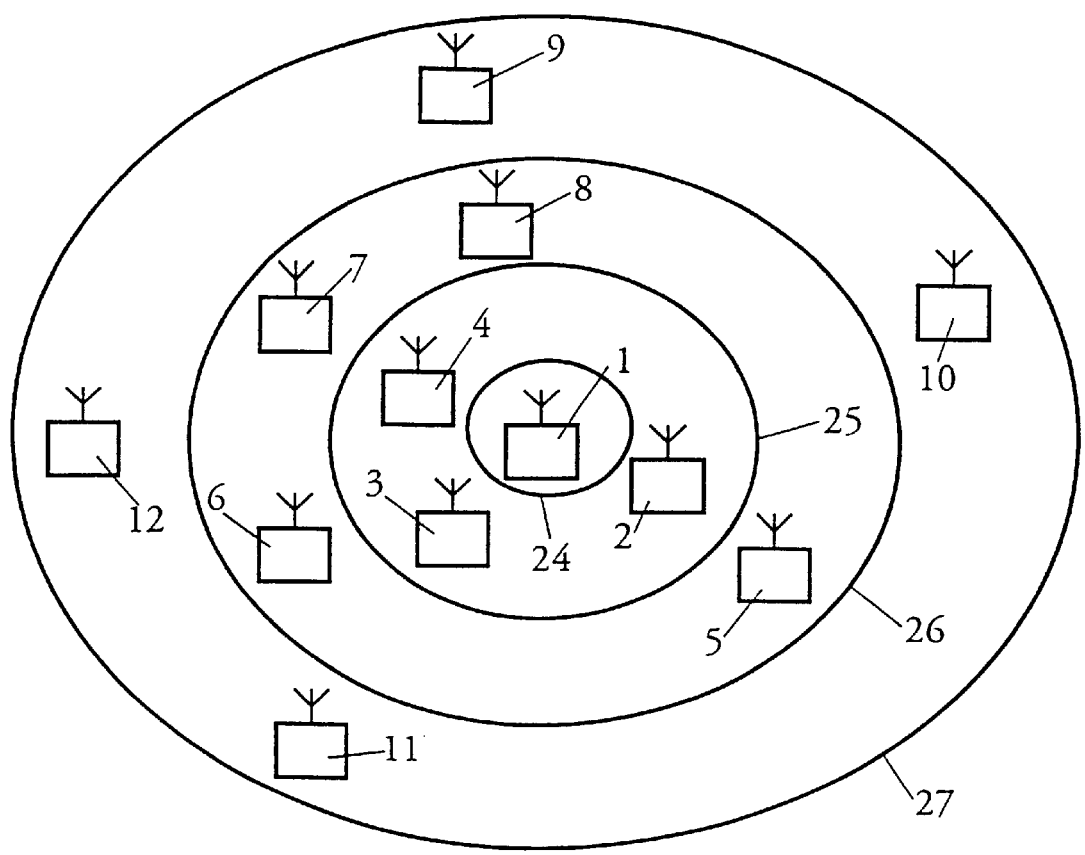
FIG. 1 shows a wireless network with a plurality of network nodes.
Figure 2:
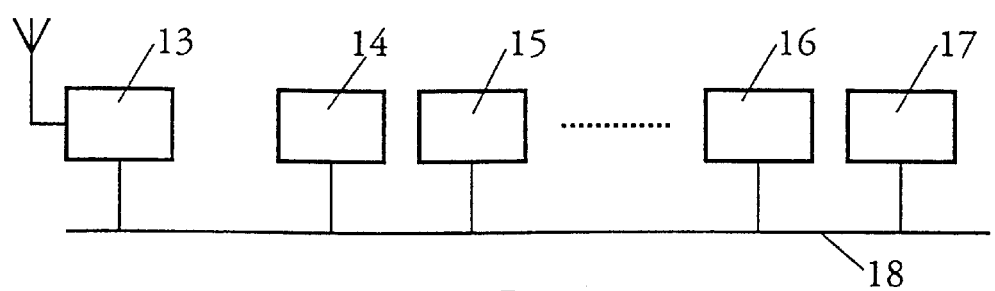
FIG. 2 shows a block diagram of a network node.

FIG. 1 shows a wireless network with a plurality of network nodes 1 to 12. The network nodes 1 to 12 exchange respective useful data, control data and synchronization data via radio links. In order to keep the data exchange and the circuit means as simple as possible, the network nodes 1 to 12 are synchronized to a main clock which is supplied by the network node 1. This network node is designated as the main network node 1. The other network nodes are referred to as secondary network nodes 2 to 12.

A network node 1 to 12 includes a radio device 13, several electrical apparatus 14 to 17, and a bus system 18. Such an electrical apparatus 14 to 17 may be a video recorder, a monitor, a tuner, a CD player etc. The radio device 13 and the electrical apparatus 14 to 17 exchange useful data, control data and synchronization data via the bus system 18. The electrical apparatus 14 to 17 and the radio device 13 are to be synchronized to the main clock via the radio link.

The main clock in the main network node 1 is provided by a clock supply which may be included in an electrical apparatus 14 to 17. This clock supply, referred to as the main clock supply, however, may also be connected to the bus system 18 outside an electrical apparatus 14 to 17. The clock supply present in each of the other network nodes 2 to 12 is referred to as a secondary clock supply and provides a secondary clock. Such a secondary clock supply may also form part of an electrical apparatus 14 to 17 of a secondary network node 2 to 12, or be connected to the relevant bus system 18 in a self-contained manner. The secondary clock supply of a secondary network node 2 to 12 receives synchronization data from the main network node 1 either directly or via other secondary network nodes so that a secondary clock supply can synchronize the secondary clock it produces with the main clock. The radio devices 13 in the network nodes 1 to 12 organize the exchange of the synchronization data via radio links.

Figure 3:
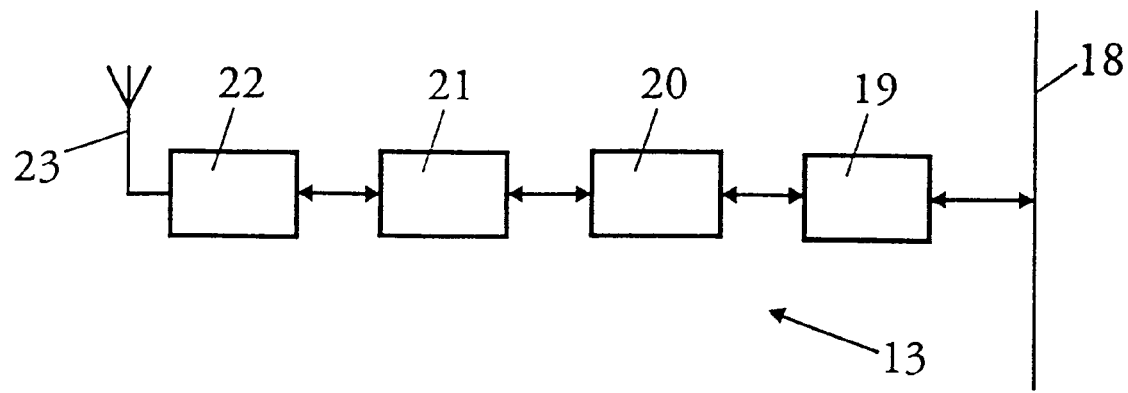
FIG. 3 shows an embodiment of a radio device to be used in the network node shown in FIG. 2.

FIG. 3 shows an embodiment of a radio device. An interface circuit 19 of the radio device 13 is connected to the bus system 18 and receives the data destined for the radio device 13 from the bus system 18 and applies this data, possibly after format adaptation, to a protocol device 20 of the radio device 13. Furthermore, the interface circuit 19 applies data supplied by the protocol device 20 to the bus system 18. In addition to the interface circuit 19 and the protocol device 20, the radio device 13 also includes a modem 21, a high frequency circuit 22 and an antenna 23. The high-frequency circuit 22 applies data received by the antenna 23 to the protocol device 20 via the modem 21.

The protocol device 20, for example constructed as a processor system, forms packet units from the data supplied by the interface circuit 19 or forms data suitable for processing by the interface circuit 19 from the packet units supplied by the modem 21. In addition to the received data, a packet unit also contains control information which is formed by the protocol device 20. The protocol device 20 utilizes protocols for the LLC layer (LLC=Logical Link Control) and the MAC layer (MAC=Medium Access Control). The MAC layer controls the multiple access to the radio transmission medium by a radio device 13 and the LLC layer performs a flow and error check.

The data exchange between the network nodes 1 to 12 in the wireless network of FIG. 1 can take place in conformity with a TDMA, FDMA or CDMA method (TDMA=Time Division Multiplex Access, FDMA=Frequency Division Multiplex Access, CDMA=Code Division Multiplex Access). Such methods may also be combined. Data is transmitted in given allocated channels. A channel is defined by a frequency range, a time range and, for example in the case of the CDMA method, also by a spread code.

The wireless network can be particularly advantageously used in buildings (for example, in the domestic field). During transmission of the data in buildings, the data may often be transmitted with low power only. Therefore, special steps must be taken in the wireless network in order to forward, for example synchronization data from the main network node to the remotest secondary network nodes. This purpose is served by the intermediate secondary network nodes which forward the synchronization data. Therefore, a hierarchical structure of network nodes with distance classes RDC(i) is formed in the wireless network. Only the main network node 1 belongs to the distance class RDC(0). All secondary network nodes which are synchronized directly by the main network node 1 belong to the distance class RDC(1). All secondary network nodes which are synchronized directly by one or more secondary network nodes of the distance class RDC(1) belong to the distance class RDC(2). Generally speaking, it may be stated that the members of a distance class RDC(i) are formed by all secondary network nodes which are synchronized by one or more secondary network nodes of the distance class RDC (i−1) or, in the case RDC(i−1)=RDC(0), by the main network node.

The secondary network nodes 2, 3 and 4 in the embodiment of a wireless network as shown in FIG. 1 belong to the distance class RDC(1), because these secondary network nodes 2, 3 and 4 can receive reliably evaluatable radio signals from the main network node 1. The outer limit of the distance class RDC(1) is symbolized by an ellipse 25 in FIG. 1. The ellipse 24 symbolizes the distance class RDC(0). The distance class RDC(2) contains the secondary network nodes 5 to 8. It is assumed that the secondary network node 5 is synchronized directly by the secondary network node 2, that the secondary network nodes 6 and 7 are synchronized directly by the secondary network nodes 3 and 4, and that the secondary network node 8 is synchronized directly by the secondary network node 4. The outer limit of the distance class RDC(2) is symbolized by an ellipse 26. The distance class RDC(3) includes the secondary network nodes 9 to 12. It is assumed that the secondary network node 9 is synchronized directly by the secondary network nodes 7 and 8, that the secondary network node 10 is synchronized directly by the secondary network node 5, that the secondary network node 11 is directly synchronized by the secondary network node 6, and that the secondary network node 12 is synchronized directly by the secondary network nodes 6 and 7. The ellipse 27 symbolizes the outer limit of the di stance class RDC(3).

Because a hierarchically structured temporal dependency is thus formed from the main network node to at least one secondary network node of the distance class RDC(n), via n distance classes RDC(i) with i≦n, each secondary clock of a secondary network node is synchronized to the main clock of the main network node. However, this holds only if the propagation delay in the wireless network is negligibly small.

The propagation delay induces a phase shift between the secondary clock signals and the main clock signal. This propagation delay can be measured, for example by measurement of the propagation time of a test message between two network nodes. When all network nodes are situated within a small radius in a domestic environment (for example, 30 m), it will not be necessary to take into account the propagation delay for the synchronization.

The forwarding of the synchronization data from a main or secondary network node of a distance class RDC(0) or RDC(i−1), with i>1, to a secondary network node of the distance class RDC(1) or RDC(i) will be described in detail hereinafter. A main or secondary network node transmits a given synchronization pattern which consists of N bits (for example, N=40). All secondary network nodes of a distance class RDC(i) use the same synchronization pattern which is distinct from the synchronization pattern of the secondary network nodes of the other distance classes RDC(j), with i≠j, and from the synchronization pattern of the main network node. In order to enhance the detectability of a synchronization pattern by a correlator in a radio device which receives a synchronization pattern in a secondary network node, such a synchronization pattern should exhibit a suitable autocorrelation property and a slight cross correlation with the other synchronization patterns.

At least in the MAC layer use is also made of a frame-synchronized signal RS for the radio transmission of data between the main and secondary network nodes 1 to 12. This frame contains several time slots for synchronization data, control data and useful data. The duration of a frame will be represented by the letter D hereinafter.

A synchronization pattern P(i) of a distance class RDC(i), with i≧0, is periodically transmitted by the main or secondary network nodes 1 to 12. The time distances between two identical synchronization patterns correspond to the duration D of the framesynchronized signal RS. As has already been described, a synchronization pattern received by a secondary network node of the distance class RDC(i), with i≧0, from the main network node or from one or more secondary network nodes of the distance class RDC(i−1), with i>1, is used for the synchronization of a secondary clock with the main clock of the distance class RDC(0) or with the secondary clock of the distance class RDC(i−1). Thus, a hierarchically structured temporal dependency arises between the main network node of the distance class RDC (0) and the secondary network nodes of all other distance classes RDC(i), with i>0.

Figure 4:
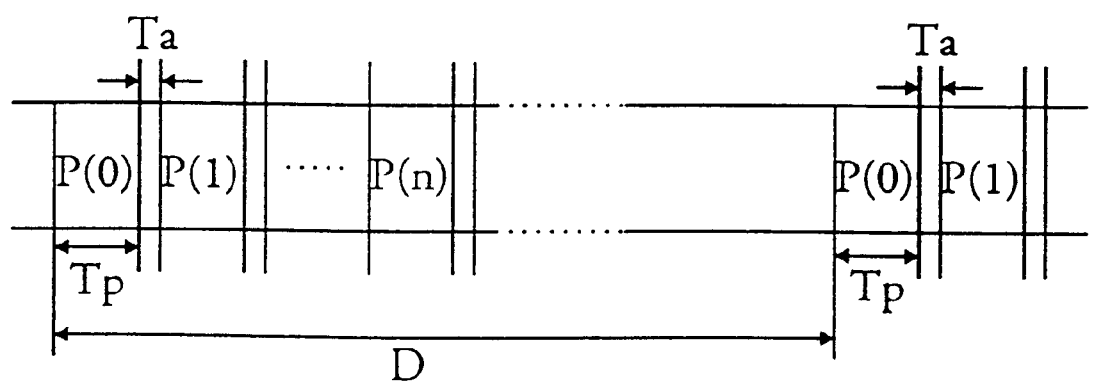
FIG. 4 shows a transmission diagram for synchronization patterns transmitted by a radio device.

FIG. 4 shows the transmission diagram of the synchronization pattern P(i), with i≧0, in relation to the frame of the frame-synchronized signal. The main network node 1 first transmits its synchronization pattern P(0). The duration of the synchronization pattern amounts to Tp. This is succeeded by a waiting period Ta which should be chosen to be such that the radio devices 13 of all secondary network nodes of the distance classes RDC(1) have sufficient time to switch over from the receiving mode to the transmission mode. All secondary network nodes of the distance class RDC(1) subsequently transmit a synchronization pattern P(1) of duration Tp. Each secondary network node of the distance class RDC(2) receives the synchronization pattern P1) from one or more secondary network nodes of the distance class RDC(1). The delays between different transmitters of P(1) are assumed to be negligibly small for the correlator which processes the received synchronization patterns and forms part of the modem 21 in a radio device 13. After a subsequent waiting period of duration Ta, each secondary network node of the distance class RDC(2) has thus synchronized its secondary clock to the secondary clock of the distance class RDC(1). Because the secondary clock of the distance class RDC(1) is synchronized to the main clock of the distance class RDC(0), the secondary clock of the distance class RDC(2) is thus indirectly synchronized to the main clock of the distance class RDC(0). All secondary network nodes of the distance class RDC(2) then transmit their synchronization pattern P(2). These synchronization operations are continued until the secondary clock has been indirectly synchronized to the main clock for all secondary network nodes in the remotest distance class RDC(n).

The correlator of the radio device 13 forms part of the modem 21. The function of a correlator in the radio device 13, correlating a synchronization pattern P(i) with a stored synchronization pattern $P_s(i)$, for example, can be imitated by a processor system included in the modem 21. The correlator supplies a pulse after the reception of a synchronization pattern P(i) which corresponds to the stored synchronization pattern $P_s(i)$. The maximum of this pulse indicates the synchronization instant for the synchronization of the secondary clock supply. This synchronization instant is applied to the protocol device 20 for further processing. Finding the synchronization instant is also necessary in order to ensure that, after reception of a synchronization pattern P(i−1), with i>0, a secondary network node can transmit its own synchronization pattern P(i) which is synchronized with the received synchronization pattern.

In each secondary network node the duration of the synchronization pattern P(i) for a radio distance class RDC (i) and the waiting time Ta can be derived, for example from a look-up table in the secondary clock supply. In this context it is assumed that the duration of all synchronization patterns P(i) of the various distance classes RDC(i) are the same. After a secondary network node of the distance class RDC (i), with i>0, has completely received a synchronization pattern P(i−1), the constant time segment between the starting instant of the synchronization pattern P(0) of the main network node and the terminating instant of the received synchronization pattern P(i−1) of the secondary network node of the distance class RDC(i−1) can be calculated. This constant time segment then amounts to i*(Tp+Ta), subject to the condition that the subsequent waiting time Ta is also taken into account. This enables exact synchronization to the main clock.

A synchronization to the absolute time of the main network node can also take place in the secondary network nodes. Such an absolute time is necessary, because actions are to take place at given instants which are related to absolute time. The total number s (s=0, 1, 2, . . . ) of synchronization patterns P(0) transmitted thus far is transmitted by the main network node and forwarded by the secondary network nodes. After reception of the total number s, in a secondary network node of the distance class RDC(i) the relevant local time is calculated for the start of its synchronization pattern P(i) in conformity with the following formula: s*D+i*(Tp+Ta). The total number s may be attached to a synchronization pattern P(i). After reception of a synchronization pattern P(i−1) by a secondary network node of the distance class RDC(i), the total number s is then derived from the supplement and attached to the new synchronization pattern P(i) to be transmitted.

A synchronization channel is used in order to transmit the synchronization pattern P(i). The total number s, however, may also be transmitted via a control or useful channel which is to be directly or indirectly received by the network nodes of all distance classes. Indirect reception means that the data of a network node is transmitted to another network node via one or more network nodes. The total number s should be transmitted during the frame s−1.

The automatic determination of its distance class RDC(i) by a main or secondary network node after putting in operation will be described hereinafter. After switching on, a secondary network node determines first of all the reception quality for the synchronization pattern P(0). When the measuring result exceeds a threshold value q, no further measurement is performed. The secondary network node thus belongs to the distance class RDC(1). The radio device 13 of this secondary network node then transmits synchronization patterns P(1) at the relevant instants. If the measuring result does not exceed the threshold value q, the secondary network node measures the reception quality for the synchronization pattern P(1). If this measuring result does not exceed the threshold value q either, the process is continued for the synchronization pattern P(2). Generally speaking, a secondary network node will continue the measuring process until a reception quality which exceeds the threshold value q has been measured for a synchronization pattern P(i−1). The secondary network node then belongs to the distance class RDC(i) and subsequently transmits a synchronization pattern P(i) in temporal dependency on the main clock.

If no measuring result with a reception quality higher than the threshold value q has been measured for all available synchronization patterns P(0) to P(n), the process for determining the distance class is terminated. The measuring procedure is then started again after an arbitrarily selected interval time. These operations are continued until a distance class has been found.

The measurement of the reception quality is performed by the modem 21 in a radio device 13. The measuring procedure, however, is controlled by the relevant associated protocol device 20. Moreover, the protocol device 20 compares the measuring results with the threshold value and executes appropriate control operations in dependence on the comparison result.

If the main and secondary network nodes are stationary and not mobile, it is not necessary to check the reception quality further and to determine the distance class. In the other case, i.e. the case involving a mobile main network node and/or mobile secondary network nodes, continuous determination of the distance class is required (adaptation process). It will be assumed hereinafter that the main network node as well as the secondary network nodes are mobile.

It is assumed that a secondary network node has been synchronized via a synchronization pattern P(m−1). This secondary network node thus belongs to a distance class RDC(m). Because the secondary network nodes and the main network node in the wireless network are mobile, the reception quality must be measured not only for the synchronization pattern P(m−1) but also for all other synchronization patterns P(0), P(1), . . . P(m−2), P(m+1), . . . P(n). Because the variations usually take place slowly, measurement of only one synchronization pattern will be required during each frame. A secondary network node compares the measured reception quality for a synchronization pattern with the threshold value q as it was performed upon putting into operation. No measurement is possible and required for the synchronization pattern P(m), because this synchronization pattern is generated by the measuring secondary network node itself. The comparison results are each time buffered.

After comparison results have become available for all synchronization patterns, the synchronization pattern P(j) with the smallest index j is selected as a substitute for P(m−1), with j≠m, if m−1>j and the reception qualities for the synchronization patterns P(j) and P(m−1) exceed the threshold value q. For the synchronization the secondary network node then utilizes the synchronization pattern P(j) as a substitute for the synchronization pattern P(m−1). In the described case the secondary network node moves in the direction of the main network node.

When the comparison results reveal that the reception quality for P(m−1) no longer exceeds the threshold value q, but that the reception quality of at least one synchronization pattern P(j)(j≠m and j≠m−1) exceeds the threshold value q, the secondary network node should then utilize the synchronization pattern P(j) as a substitute for the synchronization pattern P(m−1) for the synchronization. If several synchronization patterns P(j) exceed the threshold value q, the synchronization pattern P(j) having the smallest index j is selected. In the case where the reception quality of the synchronization pattern P(m−1) does not exceed the threshold value q and the reception quality of the synchronization pattern P(j) exceeds the threshold value q, the secondary network node moves away from the main network node.

The selection of the synchronization pattern having the smallest index j enhances the stability of the synchronization, because only a minimized number of synchronization patterns is then used for the synchronization of the secondary network node.

After a change of the synchronization to P(j), the secondary network node transmits a new synchronization pattern P(j+1) and this secondary network node then considers itself to belong to the distance class RDC(j+1). Should the measurements reveal that the reception quality for each synchronization pattern is below the threshold value q, the secondary network node should terminate the transmission of its own synchronization pattern P(m) and measure the reception quality of the synchronization pattern P(m) during the subsequent frame. When the reception quality of the synchronization pattern P(m) exceeds the threshold value q, the relevant secondary network node belongs to the distance class RDC(m+1). After reception of the synchronization pattern P(m) and a waiting period Ta, this secondary network node will transmit the synchronization pattern P(m+1).

However, if the reception quality for the synchronization pattern P(m) does not exceed the threshold value q, the secondary network node should start the synchronization pattern again after a random period. Therefore, the synchronization process must be started anew, because the secondary network node does not receive an evaluatable synchronization pattern because of the absence of neighboring secondary network nodes.

As has already been stated, a secondary network node of a distance class RDC(i) can receive synchronization patterns P(i−1) not only from one but from a plurality of secondary network nodes of the distance class RDC(i−1). The correlator of a secondary network node of the distance class RDC(i), receiving the same synchronization patterns P(i−1) from different secondary network nodes of the distance class RDC(i−1), generates an output signal which results from the superposition of the output signals for the individual synchronization patterns P(i−1).

When k of such synchronization patterns, with k>1, are received at the same time from various transmitting secondary network nodes, the correlator of a receiving secondary network node outputs a pulse-shaped signal which has the same waveform as a pulse-shaped signal after the reception of a single synchronization pattern from a transmitting secondary network node. However, the pulse-shaped signal output by the correlator after reception of k synchronization patterns has a higher signal-to-noise ratio than a pulse-shaped signal output by the correlator after the reception of a single synchronization pattern. The reception of all k synchronization patterns at the same time represents the ideal case if the signal processing delay in the transmitters of the secondary network nodes and the receiver of the relevant secondary network node and the propagation delay are not taken into account. In the ideal case the reception of k synchronization patterns enhances the synchronization evaluation.

In reality, however, the signal processing delay in the transmitters of the secondary network nodes and the receiver of the relevant secondary network node and the propagation delay must be taken into account. The signal processing delay in the transmitters and receivers can be reduced by way of a calibration process. The propagation delay will be negligibly small, as stated above, if all secondary network nodes are situated within a small radius. Subject to this condition, the pulse-shaped signal supplied by the correlator after the reception of k synchronization patterns has a smaller signal-to-noise ratio in comparison with the ideal case, but its signal-to-noise ratio will be higher than in the case of reception of only a single synchronization pattern.

A protocol device 20 in a secondary network node evaluates the pulse-shaped signals supplied by the associated correlator in order to determine the synchronization instant. If the pulse-shaped output signal of the correlator contains a pulse having a single maximum during the duration Tp of one or more received synchronization patterns and the subsequent waiting period Ta, such a maximum will correspond to the synchronization instant. When the pulse-shaped output signal of the correlator contains a pulse with a plurality of maxima of approximately the same amplitude during the duration Tp of one or more received synchronization patterns and the subsequent waiting period Ta, the mean value of the instants of the maxima will correspond to the synchronization instant. For example, a pulse-shaped signal contains three maxima. The maxima of the pulse occur at the instants t1, t2, t3. The synchronization instant ts is then given by the formula (t1+t2+t3)/3.

In the embodiment of a wireless network described thus far a secondary network node is provided with a correlator which evaluates all N bits of a received synchronization pattern. Moreover, synchronization patterns required for all the different distance classes in the wireless network must be stored in a secondary network node. This can be simplified by using W bits of the N bits of a synchronization pattern as the synchronization part required for evaluation in a correlator, where W<N. The remaining N-W bits serve to encode a number which characterizes a distance class. The correlation can thus be simplified and the storage of different synchronization patterns can be reduced. For the main network node in the distance class RDC(0), for example, the number 0 is used whereas for the secondary network nodes of the distance class RDC(1) the number 1 is used while the number 2 is used for the secondary network nodes of the distance class RDC(2). Generally speaking, the number i characterizes a secondary network node of the distance class RDC(i).

After the first W bits of a received synchronization pattern have been compared in a secondary network node, a protocol device 20 of a secondary network node evaluates the remaining N-W bits of the synchronization pattern. These N-W bits contain the number characterizing a distance class.

What is claimed is:

1. A wireless network, comprising:
a plurality of network nodes arranged to exchange data via a wireless medium, each of said nodes including,
at least one electrical apparatus, and
at least one radio device,
wherein each network node includes a clock supply for supplying said electrical apparatus and the radio device with its clock,
wherein a network node which is designated as a main network node is arranged to transmit, via its radio device, a synchronization pattern which is dependent on the clock of its clock supply,
wherein all other network nodes, designated as secondary network nodes, are assigned to different, hierarchically ordered distance classes in dependence on their distance from the main network node which is assigned to the highest distance class,
wherein all secondary network nodes of a distance class are arranged to transmit, via their respective radio device, a synchronization pattern which is dependent on the clock of their respective clock supply and characterizes the distance class, and
wherein a secondary network node is arranged to synchronize its clock supply by means of at least one received synchronization pattern of a hierarchically higher distance class.

2. A wireless network as claimed in claim 1, wherein after having been put into operation, a secondary network node finds its associated distance class by measurement of synchronization patterns of the relevant distance class, and assigns itself to the distance class which is one distance class lower than the distance class of the synchronization pattern of the highest distance class of all synchronization patterns exhibiting a sufficiently high reception quality.

3. A wireless network as claimed in claim 1,
wherein a secondary network node is arranged to measure, at given time intervals, the reception quality of all synchronization patterns, except for its own synchronization pattern, and
wherein, after evaluation of the measurements, a secondary network node assigns itself with the distance class which is one distance class lower than the distance class of the synchronization pattern of the highest distance class of all synchronization patterns exhibiting a sufficiently high reception quality.

4. A wireless network as claimed in claim 3, wherein after the measurement of the reception quality of all synchronization patterns, except for its own synchronization pattern, a secondary network node is arranged to transmit no longer its own synchronization pattern and assigns itself to a distance class which is one distance class lower if only the synchronization pattern it has thus far transmitted itself exhibits a sufficiently high reception quality.

5. A wireless network as claimed in claim 1, wherein during the period in which a synchronization pattern is awaited, a secondary network node is arranged to correlate the received signal with a stored synchronization pattern and to indicate the reception of the synchronization pattern if the correlation result corresponds to an expected value.

6. A wireless network as claimed in claim 5, wherein after the reception of a single synchronization pattern during the expected time, the correlator is arranged to output a pulse-shaped signal whose maximum value indicates the synchronization instant for the clock synchronization.

7. A wireless network as claimed in claim 5,
wherein after the reception of a plurality of synchronization patterns during the expected time, the correlator is arranged to output a pulse-shaped signal with a plurality of maximum values wherefrom the synchronization instant for the clock synchronization is derived.

8. A wireless network as claimed in claim 1,
wherein a radio device of a secondary network node includes an interface circuit, a protocol device, a modem and a high frequency circuit, and
wherein the interface circuit is arranged to exchange data between the bus system and the protocol device and the protocol device is arranged at least to control the accessing of data from and to the wireless medium and to evaluate received data.

9. A wireless network as claimed in claim 1, wherein all the synchronization patterns to be transmitted by the network nodes have an identical part and a second, different part for characterizing a distance class.

10. The wireless network of claim 9, wherein the secondary network nodes are all adapted to transmit their synchronization patterns within a frame, the frame including a first time interval during which the secondary network nodes of a first distance class transmit a synchronization pattern characterizing the first distance class, and a second time interval during which the secondary network nodes of a second distance class transmit a synchronization pattern characterizing the second distance class, with a waiting time, Ta, between the first time interval and the second time interval.

11. The wireless network of claim 9, wherein the clock supply includes a look-up table storing a value from which the network node can derive Ta.

12. The wireless network of claim 9, wherein the secondary network node of a distance class i is adapted to calculate a time T, between a starting instant of a transmission of the synchronization pattern characterizing the main network node, and a terminating instant of a received synchronization pattern of distance class (i−1) by a formula: T=i(Tp+Ta), where Tp is a time duration of each synchronization pattern.

13. The wireless network of claim 1, wherein the at least one electrical apparatus of at least one secondary network node includes one selected from the group consisting of a computer, a monitor, a video recorder, and a CD player.

14. A network node of a wireless network which includes a plurality of further network nodes which are arranged to exchange data via a wireless medium, the network node comprising:
    at least one electrical apparatus, and
    at least one radio device,
    wherein the network node includes a clock supply for supplying said electrical apparatus and the radio device with its clock,
    wherein the network node which is designated as a secondary network node belongs to a distance class, forming part of a plurality of hierarchically ordered distance classes, in dependence on its distance from a main network node which belongs to the highest distance class,
    wherein the secondary network node is arranged to transmit, via its radio device, a synchronization pattern which is dependent on the clock of the relevant clock supply and characterizes its distance class, and
    wherein the secondary network node is arranged to synchronize its clock supply by means of at least one received synchronization pattern of a hierarchically higher distance class.

15. A wireless network of nodes arranged into a plurality of hierarchically ordered distance classes and arranged to exchange data via a wireless medium, comprising:
    a main network node assigned to a highest distance class and including a clock supply; and
    a plurality of secondary network nodes arranged into a plurality of distance classes hierarchically below the highest distance class based upon a distance between each said secondary network node and the main network node, each said secondary network node including:
        a radio adapted to receive at least one synchronization pattern transmitted by a hierarchically higher distance class, and to transmit a synchronization pattern that includes information identifying the distance class of the secondary network node,
        at least one electrical apparatus, and
        a clock supply supplying the radio and electrical apparatus with a clock, and being adapted to synchronize the clock by means of the at least one synchronization pattern of a hierarchically higher distance class received and supplied by the radio.

16. The network of claim 15, wherein after having been put into operation, each secondary network node finds its distance class by measurement of synchronization patterns of at least one distance class, and assigns itself to a distance class which is one distance class lower than a distance class of a synchronization pattern having a highest distance class among all synchronization patterns exhibiting a sufficiently high reception quality.

17. The network of claim 15, wherein each secondary network node is adapted to measure, at given time intervals, a reception quality of all synchronization patterns, except for its own synchronization pattern, and after evaluation of the measurements, to assign itself to a distance class which is one distance class lower than a distance class of the synchronization pattern having the highest distance class among all synchronization patterns exhibiting a sufficiently high reception quality.

18. The network of claim 17, wherein after the measurement of the reception quality of all synchronization patterns, except for its own synchronization pattern, each secondary network node is arranged to transmit no longer its own synchronization pattern and assigns itself to a distance class which is one distance class lower if none of the measured reception qualities is sufficiently high.

19. The network of claim 15, wherein all the synchronization patterns to be transmitted by the network nodes have a first part which is identical for all synchronization patterns, and a second part that uniquely identifies a distance class associated with a node transmitting the synchronization pattern.

* * * * *